United States Patent [19]

Trias et al.

[11] Patent Number: 4,533,215

[45] Date of Patent: Aug. 6, 1985

[54] REAL-TIME ULTRA-HIGH RESOLUTION IMAGE PROJECTION DISPLAY USING LASER-ADDRESSED LIQUID CRYSTAL LIGHT VALVE

[75] Inventors: John A. Trias, La Mesa; John Marez, San Diego, both of Calif.

[73] Assignee: The United States of America as represented by the Secretary of the Navy, Washington, D.C.

[21] Appl. No.: 446,292

[22] Filed: Dec. 2, 1982

[51] Int. Cl.$^3$ .................................................. G02F 1/13
[52] U.S. Cl. .................................. 350/347 E; 350/342; 350/345
[58] Field of Search ............ 350/342, 351, 345, 347 E

[56] References Cited

U.S. PATENT DOCUMENTS

| 3,655,269 | 4/1972 | Heilmeier | 350/333 |
| 3,657,792 | 4/1972 | Hug et al. | 350/320 X |
| 3,723,651 | 3/1973 | Gorog | 350/342 |
| 4,040,047 | 8/1977 | Hareng et al. | 340/324 R |
| 4,051,465 | 9/1977 | Brody | 340/173.2 |
| 4,101,975 | 7/1978 | Brody | 365/117 |
| 4,114,991 | 9/1978 | Bleha, Jr. et al. | 350/338 |
| 4,277,141 | 7/1981 | Kleiber | 350/320 X |
| 4,483,592 | 11/1984 | Aubourg et al. | 350/342 |

FOREIGN PATENT DOCUMENTS 54-111368 8/1979 Japan .................................. 350/342

OTHER PUBLICATIONS

Sasaki, A. et al., "Laser-Addressed Liquid-Crystal Multifunction Light Valve," *Proceedings of the SID*, vol. 21, No. 4, (1980), pp. 341–344.

Dewey, A. G. & Crow, J. D. "The Application of GaAlAs Lasers to High-Resolution Liquid Crystal Projection Displays," *IBM J. Res. Develop.*, vol. 26, No. 2, (Mar. 1982), pp. 177–185.

Reif, P. G. et al., "Hybrid Liquid Crystal Light Valve-Image Tube Devices for Optical Data Processing," *Proc. of Soc'y Photo-Optical Instrum. Eng'rs.*, vol. 83, (Aug. 24–25, 1976), pp. 34–43.

*Primary Examiner*—John K. Corbin
*Assistant Examiner*—Richard F. Gallivan
*Attorney, Agent, or Firm*—R. F. Beers; E. F. Johnston; T. G. Keough

[57] ABSTRACT

A more clearly defined image is projected onto a distant screen in real-time at video rates to allow for collective analysis of rapidly changing updated data. A laser has its coherent beam modulated in accordance with the images to be viewed. The modulated light beam is scanned across the surface of a liquid crystal light valve to stimulate a photosensor layer that impresses a replica voltage pattern on the bi-refringent liquid crystal. A high intensity projection light beam is reflected from the liquid crystal via a polarizing biprism and, consequently, is modulated by the bi-refringent liquid crystal so that a corresponding image is displayed on the screen. The controllable small spot diameter of the modulated laser beam is capable of greatly improving the resolution as it scans across the liquid crystal light valve. The hybrid field effect nematic liquid crystal layer, plus a direct creation of replica voltages by the impinging modulated coherent light, gives the system an instantaneous, truly real-time capability.

1 Claim, 2 Drawing Figures

REAL-TIME ULTRA-HIGH RESOLUTION IMAGE PROJECTION DISPLAY USING LASER-ADDRESSED LIQUID CRYSTAL LIGHT VALVE

STATEMENT OF GOVERNMENT INTEREST

The invention described herein may be manufactured and used by or for the Government of the United State of America for governmental purposes without the payment of any royalties thereon or therefor.

BACKGROUND OF THE INVENTION

Large screen display systems are a highly effective means for showing a large group information requiring their analysis and decision. By and large, a number of contemporary systems have worked well, particularly where the displayed information has few modifying data inputs.

However, the vastly increased data inputs in some large complex systems have overtaxed the capabilities of the state-of-the-art visual displays. For example, in certain military applications, vast amounts of data are generated which represent a multitude of significant factors to be considered for tactical or strategic situations and these amounts are constantly being updated. Planners and tacticians need constant real-time apprisals of situations to arrive at meaningful solutions. Contemporary displays simply are incapable of handling or displaying this data in a real-time detailed presentation.

One well known large screen display system has a pair of smectic liquid crystal light valves that are thermally addressed by a laser. The writing operations within the crystals are accomplished by a heating created by the impinging modulated laser beam and subsequent cooling action of the liquid crystals. Changing the AC biases is hoped to speed up the writing and erasing operation; however, experience has demonstrated that real-time capability is compromised by the inherent characteristics of these smectic type liquid crystals.

One tried display relies upon a cathode ray tube to photoactivate a liquid crystal light valve. While somewhat faster and responsive changes have been noted, the inability of the cathode ray tube to more specifically display the required small spots compromises the inherent resolution of the nematic liquid crystal light valve. Their full utilization potential is wasted in the CRT design.

Thus, there is a continuing need in the state-of-the-art which advantageously employs the superior narrow beam focusing capabilities of a laser to directly actuate a nematic liquid crystal light valve to provide for a high resolution real-time display of an image on a remote screen.

SUMMARY OF THE INVENTION

The present invention is directed to providing an apparatus for displaying real-time projected images on a distant screen (front or rear projection screen). A laser provides a modulated coherent light which is scanned in X and Y directions across the surface of a nematic liquid crystal light valve. The impinging modulated beam affects a photosensor layer to impress a replica voltage pattern on the contiguous liquid crystal. The voltage pattern electrically alters the electro-optic properties of the liquid crystal layer to modulate and reflect a high intensity projection light beam onto the distant screen.

It is a prime object of the invention to provide an improved remote large screen display capable of operating in real-time.

Another object of the invention is to provide a real-time display having the capability to be rapidly updated.

Yet another object is to provide a screen display of a multitude of data inputs in a higher resolution.

Still another object is to provide a screen display ideally suited to present a multitude of updates simultaneously.

Still another object is to present a high resolution real-time screen display relying upon the spatial coherence properties of the modulated laser beam to actuate a nematic liquid crystal light valve to achieve heretofore unobtainable resolution and response.

Yet another object is to provide a large screen visual display system relying upon the reflection of a high intensity projection light source from a liquid crystal light valve surface to create visual representations.

These and other objects, advantages and novel features of the invention will become apparent from the following detailed description of the invention when considered in conjunction with the accompanying drawings.

DESCRIPTION OF THE PREFERRED EMBODIMENT

Figure 1:
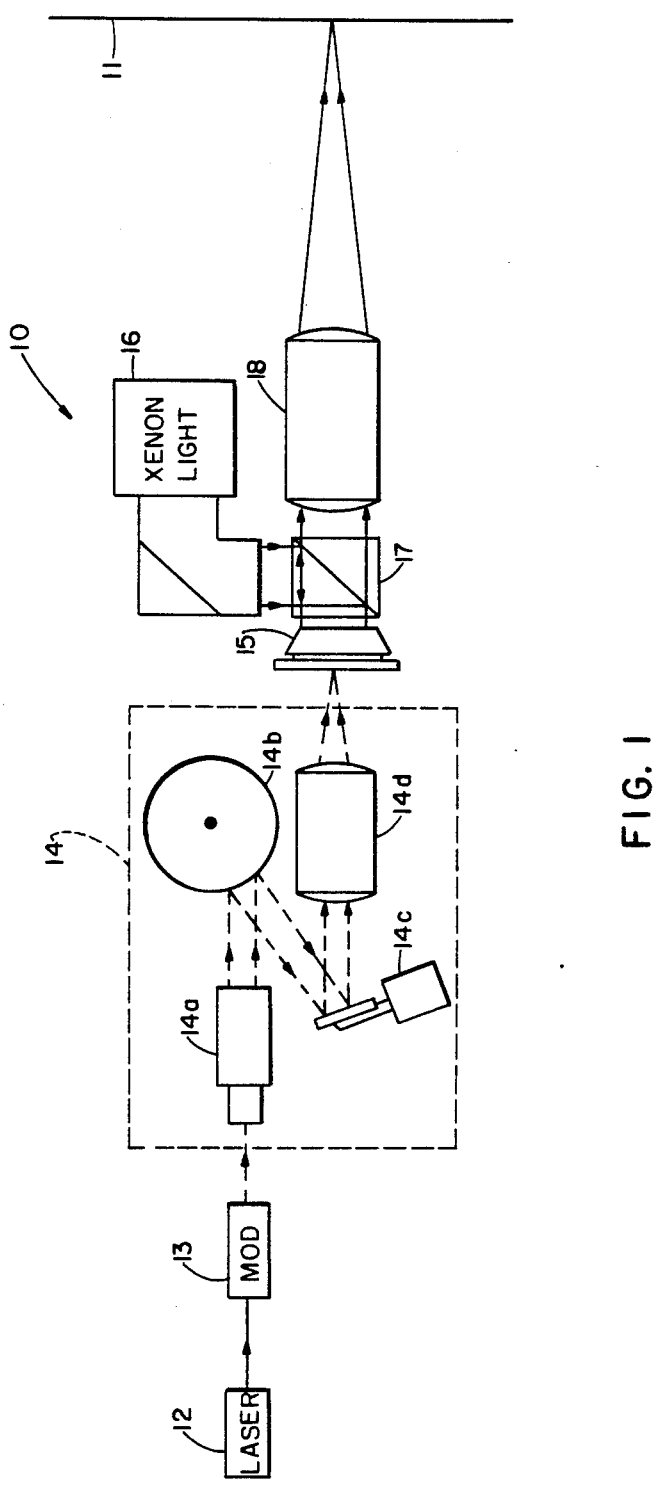
FIG. 1 depicts a schematic representation of the principal constituents of the invention.

Referring now to the drawings a visual display system 10 fabricated in accordance with the teachings of this inventive concept has the capability for making accurate real-time high resolution representations on a remote screen 11. The screen simultaneously gives a vast number of viewers the opportunity to absorb, coordinate and otherwise act upon the information content in the quickest possible time. Because of the response times of the elements to be described below, real-time video displays are well within the capabilities of this system.

The first of the principal components of the display system is a laser 12 which is used to generate the addressing or writing beam. An argon-ion laser at 514.5 nanometers in the $TEM_{00}$ mode has been found to be most suitable with the particular light valve used because of its spectral sensitivity. A model 95-4by Lexel generates a narrow width beam in the green wavelength. This wavelength has been chosen to match the spectral response of other components to be elaborated on below. Operation in the fundamental mode ($TEM_{00}$) was found to be the best choice to focus the laser beam to the smallest possible spot size.

The beam passes to a modulator 13 that is used for amplitude modulation of the laser beam. Any one of several conventional modulators could be used. A transverse field electrooptic modulator model 3050 by Coherent Associates, Inc. was found to operate satisfactorily to impart amplitude variations in the green wavelength for responsive operation of the following components.

In a raster scanner 14 a conventional video type scan of the modulated laser beam is made in the X and Y direction over a given writing surface. A laser scanner 14 such as that manufactured by Lincoln Laser Co., model RS-3 includes a beam expander 14a, a rotating polygon mirror horizontal scan 14b, a galvanometer-driven mirror vertical scan 14c, and a writing or focusing lens 14d. The raster scanner can operate at a standard 525 TV scan rate and will interface with RS-170 composite video.

A two thousand line resolution over a 50 mm diametered area has been demonstrated. This resolution, however, was not done at video rates because of the limitations of the above identified scanner. Improvement in the scanner can well achieve video rates at much higher resolutions.

Figure 2:
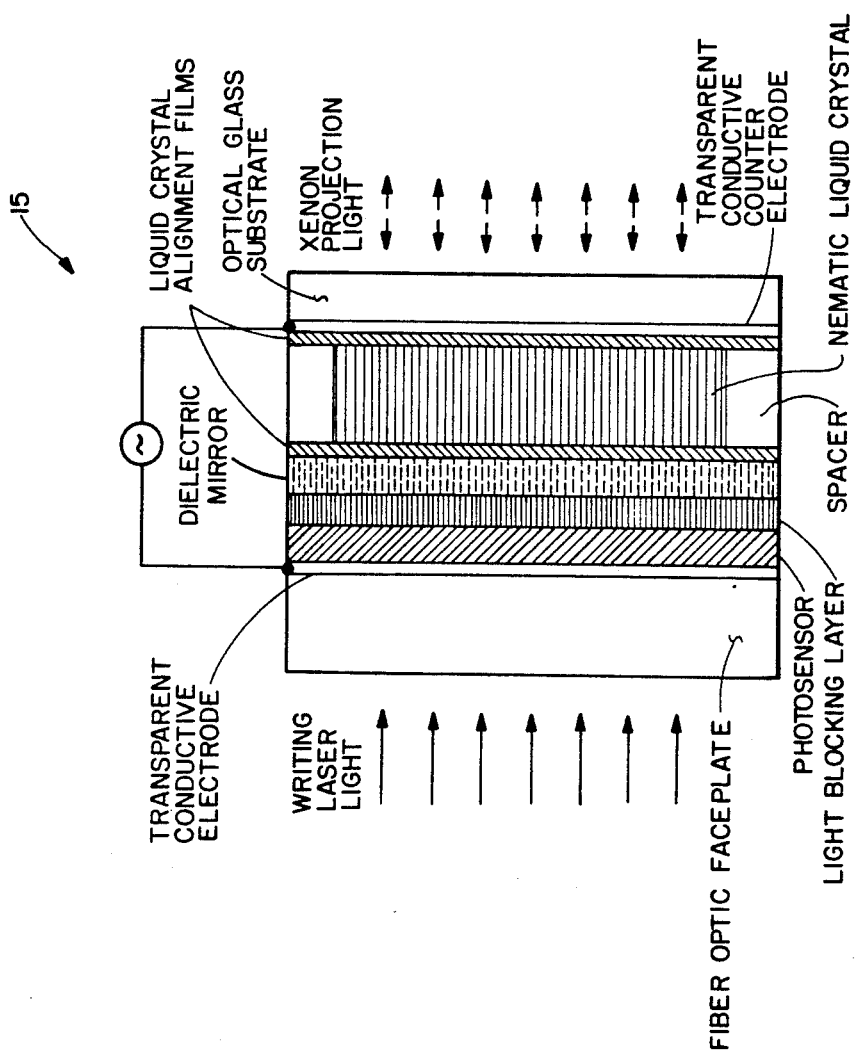
FIG. 2 shows a typical liquid crystal light valve used in the preferred embodiment of the invention.

The scanning modulated signals are directed onto a liquid crystal light valve 15 which functions as a spatial light modulator. A typical light valve used was a model H4053 by Hughes Aircraft Company which is within the model H4060 family of liquid crystals. Schematically the valve is operatively interrelated as shown in FIG. 2.

The writing modulated laser light beam impinges on an approximately 50 millimeter diameter surface area of a fiber optic face plate. After passing through a transparent conductive electrode, it hits a photosensor layer, in this case a cadmium sulphide layer that is responsive to light in the green wavelength. The photosensor detects the input light image and impresses a replica voltage pattern on the nematic liquid crystal. The voltage pattern of the image on the liquid crystal electrically alters the optical properties by the phenomena of bi-refringence to modulate the polarization properties of the outputted light.

In this case the outputted light comes from a high intensity Xenon light source 16. When it is reflected from the modulated light valve, it becomes the image projected on the screen.

The light valve performs its function at video rates while maintaining a high resolution and grey scale quality of the image. Between the liquid crystal and photosensor, a combination light-blocking-layer-dielectric mirror is placed to isolate the input and output light beams. The dielectric mirror serves to reflect the high intensity Xenon output light back through the liquid crystal and the light blocking layer prevents residual output light leakage to the photosensor.

The light valve is a reflective liquid crystal device which acts like a controlled bi-refringence mirror and is used to rotate polarized light for image generation. The collimated unpolarized projection light comes first from the high intensity Xenon light source, mentioned above, then to a polarization cube in the form of a McNeille biprism 17 and a telecentric projection lens 18. The McNeille biprism serves both as a polarizer and an analyzer to transmit optical information from the liquid crystal light valve for projection to the distant screen.

In operation, the image to be projected onto large screen is written into the liquid crystal light valve 15 by means of a modulated laser beam which scans with low power visible radiation. The scanning laser beam activates each pixel in the photosensitive Cadmium Sulfide layer and changes the impedance of each pixel in proportion to the modulated light intensity. The impedance changes control the level of voltage applied across the liquid crystal layer at each pixel. This change of the voltage is instantaneous and is therefore real-time in the truest sense.

The modulated laser beam written on the photosensitive elements of the light valve switches the AC voltage to the liquid crystal layer. This forms the replica image across the liquid crystal light valve by causing the molecules to rotate in accorance with the localized field changes with a consequent change of bi-refringence. The bi-refringence change causes a change in the polarization output of the plane-polarized high intensity light beam coming from source 16 through biprism 17 to be reflected onto the screen via the projection lens.

Obviously many modifications and variations of the present invention are possible in the light of the above teachings. It is therefore to be understood that within the scope of the appended claims the invention may be practiced otherwise than as specifically described.

What is claimed is:

1. An apparatus for displaying real-time ultra-high resolution projected images on a distant screen at video scan rates comprising:
    a laser directing a beam to a modulator for providing a modulated beam of coherent light;
    a beam expander disposed to receive the modulated coherent light beam, an X-scanner and a Y-scanner receiving the expanded modulated coherent light beam and a field flattening lens orientated to receive the X and Y scanned expanded modulated coherent light beam disposed to receive the modulated coherent light beam for imparting a vertical and horizontal scanning thereof;
    a nematic field effect liquid crystal light valve aligned to receive the scanned modulated coherent light beam for selectively changing its birefringence effect to modulate polarized light in direct response to the voltage pattern directly produced by photoactivation therein by the modulated coherent light beam;
    a light source disposed for projecting a high intensity light beam in a light path to the nematic liquid crystal light valve; and
    a polarized beam splitter interposed in the light path between the nematic liquid crystal light valve and the high intensity light beam source for polarizing and reflecting high intensity polarized light onto the nematic liquid crystal light valve and for directing reflected modulated polarized high intensity light modulated in accordance with the modulated coherent light beam onto the distant screen in the form of the real-time high-resolution images at video scan rates.

* * * * *